(12) United States Patent
Seta

(10) Patent No.: US 6,310,546 B1
(45) Date of Patent: Oct. 30, 2001

(54) STEREO TYPE VEHICLE MONITORING APPARATUS WITH A FAIL-SAFE FUNCTION

(75) Inventor: Itaru Seta, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/614,903

(22) Filed: Jul. 12, 2000

(30) Foreign Application Priority Data

Jul. 14, 1999 (JP) .................................................. 11-199939

(51) Int. Cl.$^7$ .................................................. G08B 29/00
(52) U.S. Cl. .......................... 340/507; 340/937; 382/104; 348/148
(58) Field of Search .................................... 340/507, 937; 382/104; 348/118, 148

(56) References Cited

U.S. PATENT DOCUMENTS 5,987,152 * 11/1999 Weisser ................................. 340/937

* cited by examiner

Primary Examiner—Edward Lefkowitz
(74) Attorney, Agent, or Firm—Smith, Gambrell & Russell, LLP

(57) ABSTRACT

A stereo type vehicle monitoring apparatus with a fail-safe function comprises a pair of cameras 1, 2, a stereo image producer 3, 4, 5, a calculator 12 and a fail decision unit 12. The pair of cameras 1, 2 take pictures of scenes outside of a vehicle. The stereo image producer 3, 4, 5 produces a first image and a second image respectively based on pictures; taken by the cameras 1, 2. The calculator 12 calculates a level of brightness of a first monitor area in the first image produced by the stereo image producer 3, 4, 5 and a level of brightness of a second monitor area in the second image produced by the stereo image producer 3, 4, 5. The fail decision unit 12 determines a failure of the vehicle monitoring apparatus when a difference between the brightness level of the first monitor area and the brightness level of the second monitor area exceeds a predetermined value. The second monitor area positionally corresponds to the first monitor area.

13 Claims, 3 Drawing Sheets

STEREO TYPE VEHICLE MONITORING APPARATUS WITH A FAIL-SAFE FUNCTION

BACKGROUND OF THE INVENTION

1. Field of the Invention

The present invention relates to a stereo type vehicle monitoring apparatus that executes a fail-safe function when an anomaly occurs with a pair of images taken by stereoscopic cameras.

2. Description of the Related Art

In recent years, attention has been focused on a stereo type vehicle monitoring apparatus using on-board cameras. Each camera has a built-in solid-state image sensing device, such as CCD. The monitoring apparatus determines a positional deviation of an object, that is a parallax, from a pair of images taken by left and right cameras (stereoscopic cameras) and calculates a distance to the object (distance information) by using a principle of triangulation. Then, based on the calculated distance, the monitoring apparatus recognizes the running surrounding (e.g., the distance between an outside object and the self vehicle) and alerts the vehicle driver or performs a vehicle control such as shiftdown, as required.

In a practical application of the stereo type vehicle monitoring apparatus, a fail-safe function needs to be provided to guarantee the safe operation of the apparatus. One of failures to be detected in such a vehicle monitoring apparatus is a brightness unbalance in the pair of images (stereoscopic images) taken by stereoscopic cameras. The brightness unbalance is caused by external causes. In order to secure a precision for calculating the distance to the object or recognizing a three-dimensional object in front of the vehicle, by a stereo method based on the principle of triangulation, the brightnesses of the left and right images are set to be balanced. That is, the brightnesses thereof are set so that overall luminance of the pair of images is substantially same. The unbalance in the brightnesses of the pair of images due to external causes will hinder normal monitoring of the outside of the vehicle. The external causes for such anomaly, for example, include an accidental situation where a view scope of one of the stereoscopic cameras is blindfolded. The anomaly also occurs when the optical system (particularly lens) of one of the cameras is smeared or fogged. Further, when a scene in front is taken through the windshield, partially smeared or fogged windshield or irregular reflection due to raindrops may also cause the brightness unbalance. In order to secure a high level of safety of the stereo type vehicle monitoring apparatus, when there is a brightness unbalance between the left and right images, the fail-safe function needs to be activated, so as to temporarily stop the monitor control.

Since the fail-safe function, which is essential in the practical application of the stereo type vehicle monitoring apparatus, has not been established, however, there is a problem for securing a high level of safety of the apparatus.

SUMMARY OF THE INVENTION

An object of the present invention is to provide a stereo type vehicle monitoring apparatus that can precisely detect a brightness unbalance, which occurs in stereoscopic images and make an appropriate stereo processing impossible, and thereby can execute a secure fail-safe function.

The object can be achieved by a stereo type vehicle monitoring apparatus with a fail-safe function, which executes the fail-safe function when the vehicle monitoring apparatus is determined as a failure. The apparatus comprises a pair of cameras, a stereo image producer, a calculator and a fail decision unit. The pair of cameras take pictures of scenes outside of a vehicle. The stereo image producer produces a first image and a second image respectively based on pictures taken by the cameras. The calculator calculates a level of brightness of a first monitor area in the first image produced by the stereo image producer and a level of brightness of a second monitor area in the second image produced by the stereo image producer. The fail decision unit determines a failure of the vehicle monitoring apparatus when a difference between the brightness level of the first monitor area and the brightness level of the second monitor area exceeds a predetermined value. The second monitor area positionally corresponds to the first monitor area.

According to the above-mentioned stereo type vehicle monitoring apparatus, by monitoring the brightness balance, for example, when a normal image cannot be obtained as when one of the cameras is blindfolded, it is possible to accurately detect it. The same also applies when a normal image cannot be obtained due to partial smear or fogging of the lens of one of the cameras, of windshield or the like, or due to diffused reflections from raindrops.

The above-mentioned stereo type vehicle monitoring apparatus may further comprise a processor. The processor executes the fail-safe function on the basis of the failure decision by the failure decision unit.

Accordingly, even when an abnormal image is generated due to theses external causes, the fail-safe function can be executed, securing a high level of safety of the stereo type vehicle monitoring apparatus.

In the stereo type vehicle monitoring apparatus, it is preferable that a position of the second monitor area in the second image is offset in a stereo matching direction from a position of the first monitor area in the first image. This makes the views shown in the first and second monitor areas substantially same. Accordingly, the overall brightness of the two monitor areas under the normal condition results approximately in the same levels.

Further, in the stereo type vehicle monitoring apparatus, it is also preferable that the calculator calculates the level of the brightness of the first monitor area based on image data of a part of the first monitoring area, and the level of brightness of the second monitor area based on image data of a part of the second monitor area. This prevents an amount of calculations from increasing.

Furthermore, in the stereo type vehicle monitoring apparatus, it is also preferable that the first monitor area comprises a plurality of monitor portions set in different positions in the first image, the second monitor area comprises a plurality of monitor portions set in different positions in the second image and positionally corresponding to the respective monitor portions in the first monitor area. A position of each monitor portion of the second monitor area may preferably offset in a stereo matching direction from a position of the monitor portion of the first monitor area, the monitor portion of the first monitor area positionally corresponding to the monitor portion of the second monitor area. Further, the amounts of offsets of the monitor portions of the second monitor area to the respective monitor portions of the first monitor area may preferably differ from one another.

This allows the offset of each monitor area to be determined according to the parallax of a three-dimensional object that is highly likely to be shown in that monitor area. This in turn makes the levels of overall brightness of the first and second monitor areas more closely equal to each other.

The above-mentioned object can be also achieved by a stereo type vehicle monitoring method, the method comprising:

taking pictures of scenes outside of a vehicle by a pair of cameras;

producing a first image and a second image based on the thus taken pictures;

calculating a level of brightness of a first monitor area in the first image thus produced and a level of brightness of a second monitor area in the second image thus produced, the second monitor area positionally corresponding to the first monitor area; and determining a failure of the vehicle monitoring apparatus when a difference between the brightness level of the first monitor area and the brightness level of the second monitor area exceeds a predetermined value.

According to the above-mentioned stereo type vehicle monitoring method, by monitoring the brightness balance, for example, when a normal image cannot be obtained as when one of the cameras is blindfolded, it is possible to accurately detect it. The same also applies when a normal image cannot be obtained due to partial smear or fogging of the lens of one of the cameras, of windshield or the like, or due to diffused reflections from raindrops.

In the fail-safe decision method, it is preferable advantageous that the calculating step comprises:

reading brightness values of pixels in the first monitor area and the second monitor area; and calculating a brightness average of the first monitor area and a brightness average of the second monitor area.

The fail decision, according to the above-mentioned fail-safe decision method, is executed based on the image data of a part of the image, not the entire image. Therefore, the fail decision can be made with such a small amount of calculations as will allow the fail detection to be carried out in real time.

In the fail-safe decision method, it is also preferable advantageous that the calculating step comprises:

setting a fail-flag to "0" when the difference between the brightness level of the first monitor area and the brightness level of the second monitor area does not exceed the predetermined value; and setting the fail-flag to "1" when the difference between the brightness level of the first monitor area and the brightness level of the second monitor area exceeds the predetermined value, wherein the determining step determines the failure of the vehicle monitoring apparatus when the fail-flag is set to "1".

The fail-flag "0" setting step may preferably set the fail-flag to "0" when conditions that between the brightness level of the first monitor area and the brightness level of the second monitor area does not exceed the predetermined value have been continuously repeated twice or more. The fail-flag "1" setting step may preferably set the fail-flag to "1" when conditions that between the brightness level of the first monitor area and the brightness level of the second monitor area exceeds the predetermined value have been continuously repeated twice or more. The fail flag, according to the above-mentioned fail-safe decision method, is switched only after the corresponding condition has continued for the given cycles. Therefore, it is possible to secure the reliability of the fail decision.

The above-mentioned object can be further achieved by a stereo type vehicle monitoring apparatus with a fail-safe function, the apparatus comprising photographing means, stereo image producing means, calculating means and fail decision means. The photographing means takes pictures of scenes outside of a vehicle. The stereo image producing means produces a first image and a second image respectively based on the pictures taken by the photographing means. The calculating means calculates a level of brightness of a first monitor area in the first image produced by the stereo image producing means and a level of brightness of a second monitor area in the second image produced by the stereo image producing means. The fail decision means determines a failure of the vehicle monitoring apparatus when a difference between the brightness level of the first monitor area and the brightness level of the second monitor area exceeds a predetermined value. The second monitor area positionally corresponds to the first monitor area.

DETAILED DESCRIPTION OF THE PREFERRED EMBODIMENT

Figure 1:
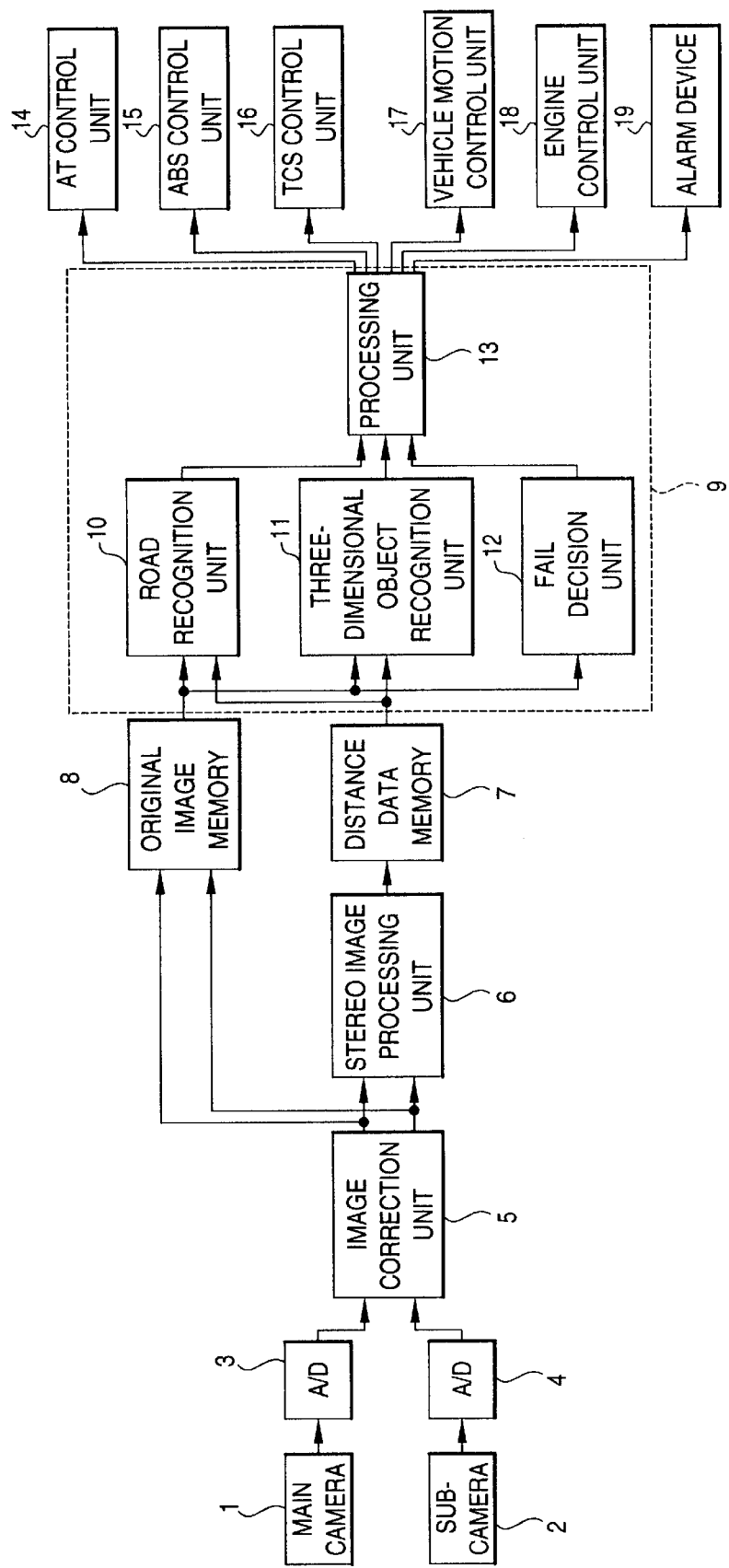
FIG. 1 is a block diagram showing a stereo type vehicle monitoring apparatus according to an embodiment of the present invention.

FIG. 1 is a block diagram of the stereo type vehicle monitoring apparatus according to an embodiment of the present invention. A pair of cameras 1, 2 with a built-in image sensor such as CCD are mounted near the rearview mirror with a predetermined interval therebetween in a vehicle width direction and are designed to take pictures of a scene in front of the vehicle through the windshield. The pair of cameras 1, 2 are composed of a main camera 1 provided on the right-hand side and a sub-camera 2 provided on the left-hand side. The main camera 1 takes a reference image (right image) used in the stereo processing when the vehicle is viewed in the forward direction. The sub-camera 2 takes a comparison image (left image) to be compared with the reference image in this processing. With both of these cameras synchronized, analog images output from the cameras 1, 2 are converted by A/D converters 3, 4 into digital images with a predetermined range of luminance levels (for example, 256 gray scale levels). The digital images are subjected to luminance correction and geometric conversion in an image correction unit 5. There are some degrees of error in the mounting positions of the pair of cameras 1, 2, which results in a deviation between the left and right images. To correct this deviation, the affine transformation or the like is used to perform geometric transformation, such as rotation of the images and parallel displacement on the images. Then, the reference image and the comparison image corrected in this manner are stored in an original image memory 8.

A stereoscopic image processing unit 6 calculates a three-dimensional position of an object (including a distance from the self vehicle to the object) shown in the images by using the reference and comparison images corrected by the image correction unit 5. The distance from the self vehicle to the object can be calculated from a relative positional deviation (parallax) according to the principle of triangulation. The relative positional deviation (parallax) is a relative positional deviation of the object in the left image relative to the corresponding object in the right image. The image distance information calculated in this way is stored in a distance data memory 7.

A microcomputer 9, based on various information stored in the original image memory 8 and the distance data memory 7, recognizes the condition of the road in front of the vehicle (road recognition unit 10) and a three-dimensional object (running vehicle) in front (three-dimensional object recognition unit 11). Then, a processing unit 13 checks information from these recognition units 10, 11. Then, the processing unit 13 alerts the vehicle driver by an alarm device 19 such as monitor and speaker when it decides it is necessary to issue an alarm. The processing unit 13 may control a variety of control units 14–18, as required. For example, the processing unit 13 directs an AT (automatic transmission) control unit 14 to execute the shiftdown. It may demand an engine control unit 18 to lower the engine output. It is also possible to issue an appropriate vehicle control command to an antilock brake system (ABS) control unit 15, a traction control system (TCS) control unit 16, or a car behavior control unit 17 as a vehicle motion control unit that controls wheel torque distribution and revolution.

Further, a fail decision unit 12 decides a failure of the vehicle monitoring apparatus according to a fail decision routine described later on the basis of the original image information stored in the original image memory 8, i.e., the brightness unbalance of the reference and the comparison images. During the period in which the fail decision unit 12 decides that the vehicle monitoring apparatus "fails", i.e., during the period in which the fail decision routine described later sets a fail flag NG to 1, the vehicle control or the like described above is temporarily stopped to prevent erroneous operation of the apparatus caused by erroneous recognition of road and solid objects.

Figure 2:
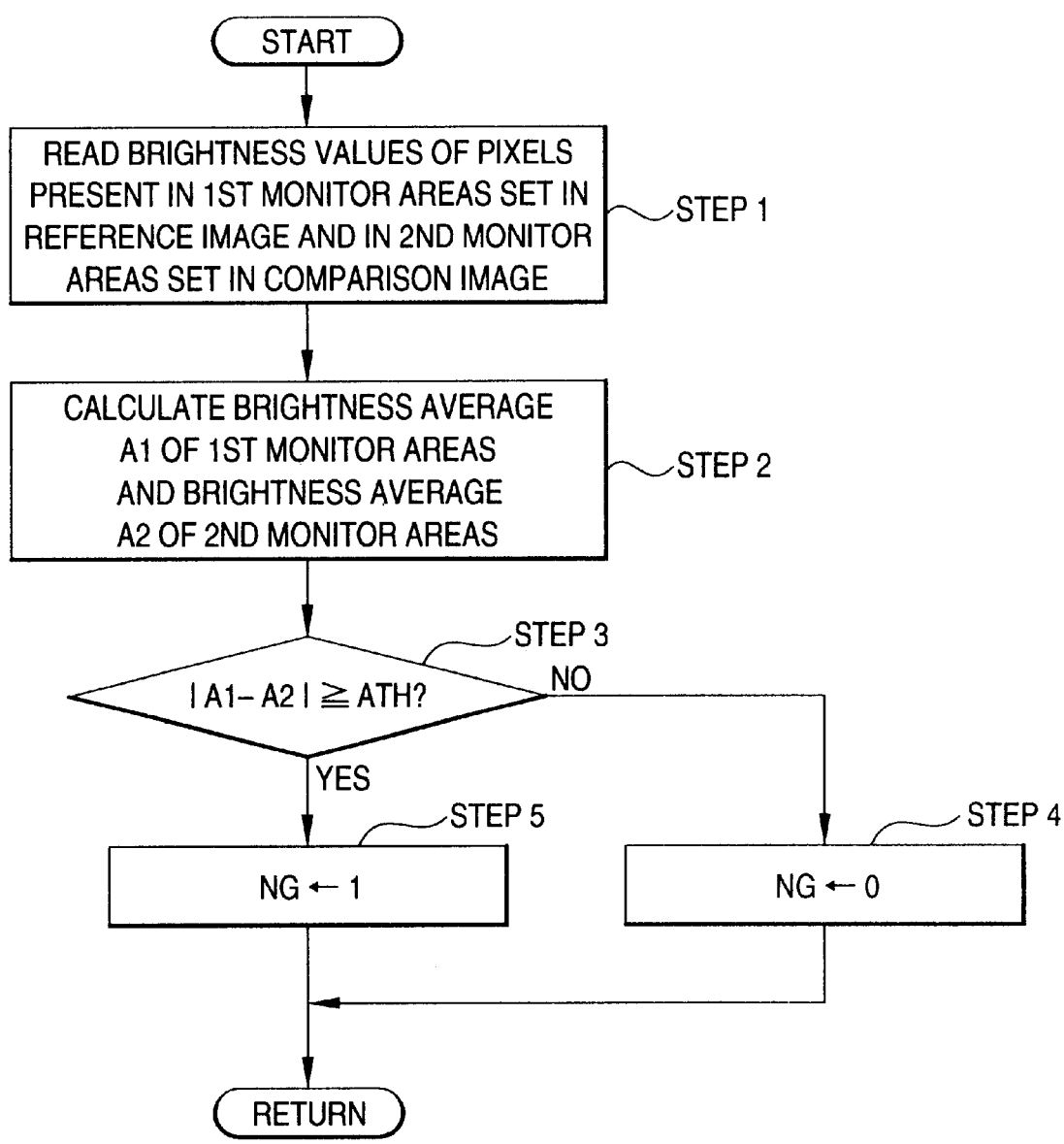
FIG. 2 is a flow chart showing a fail decision routine based on a brightness unbalance.

FIG. 2 is a flowchart showing the fail decision routine based on the brightness unbalance. This flowchart is executed repetitively every predetermined control cycle (e.g., every 100 ms). When the fail flag NG is set to 1, the fail decision unit 12, according to the fail decision routine, informs the processing unit 13 of the setting of the flag. Then, the processing unit 13 executes the fail-safe function of this vehicle monitoring apparatus.

Figure 3:
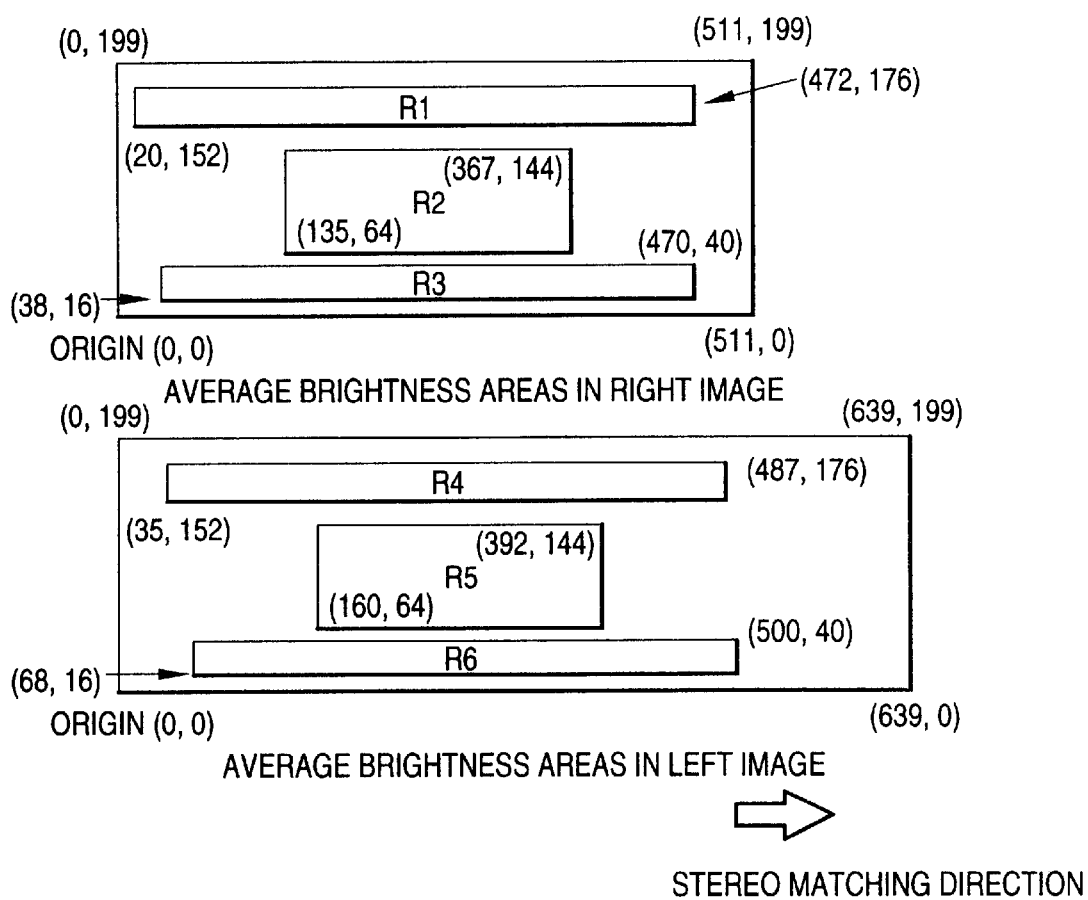
FIG. 3 is a diagram showing monitor areas set in stereoscopic images.

First, at step 1, a brightness value of each pixel in monitored areas (hereinafter referred to "monitor area") is read to check a brightness condition of the pair of the stereoscopic images (reference image and comparison image) (step 1). FIG. 3 shows the monitor areas set in image areas of the pair of stereoscopic images. The right image, i.e., the reference image, has a size of 200 pixels×512 pixels. For example, in the right image, monitor areas R1, R2, R3 are set in upper, middle and lower regions, respectively. The left image, i.e., the comparison image, has a size of 200 pixel×640 pixel. For example, in the left image, monitor areas R4, R5, R6 are set in upper, middle and lower regions, respectively. To consider a stereo matching of a stereo method, the left image has a larger number of pixels set than the right image in the horizontal direction. The stereo method is a method that searches for an object in the comparison image, which matches a corresponding object in the reference image (the stereo matching) and determines a three-dimensional distance to the object based on a parallax of the object between the two images (offset in a direction of the stereo matching (hereinafter, referred to "a stereo matching direction")). The smaller the distance from the cameras to the object is, the larger the offset in the stereo matching direction will be. Hence, to calculate the distance to an object positioned at the right end of the right image, the right end of the left image needs to be expanded in the stereo matching direction.

The monitor areas R1, R2, R3 "positionally correspond" to the monitor areas R4, R5, R6 in the left image. In this specification, the phrase "positionally correspond" means not only a case where the left and right monitor areas are set in perfectly the same positions but also a case where they are set slightly offset in position considering the stereo matching. The amount of this offset should preferably be determined by taking into account the tendency of the parallax of an object that would generally exist in each of the monitor areas. For example, in the vehicle monitoring operation that monitors the road ahead of the vehicle, the monitor areas R1, R4 set in the upper part of the image areas are normally likely to monitor the sky (infinitely faraway) and relatively distant three-dimensional objects (e.g., buildings). Hence, the parallax calculated in these areas tends to become relatively small. Therefore, considering the tendency of the distance to the three-dimensional objects and the like shown at the upper part of the images, the offset associated with the monitor areas R1, R4 is set somewhat smaller than normal. For example, as shown in FIG. 3, the monitor area R4 is offset 15 pixels in the stereo matching direction from the monitor area R1. The monitor areas R2, R5 set in the middle of the image areas are generally Likely to monitor vehicles or other objects running in front and thus the parallax in these areas tend to be of an intermediate degree. Hence, considering the characteristic of the view shown in the middle part of the image, the offset associated with the monitor areas R2, R5 is set at an intermediate degree. From the result of experiments, it is desirable that the distance be contemplated to be at about 30–40 meters. As one example, the monitor area R5 is offset 25 pixels in the stereo matching direction from the monitor area R2, as shown in FIG. 3. Further, the monitor areas R3, R6 set at the lower part of the image areas are normally likely to monitor the ground such as road and therefore the parallax in these areas tend to become relatively large. Considering the characteristic of the view shown at the lower part of the images, the offset associated with the monitor areas R3, R6 is set relatively large. For example, the monitor area R6 is offset 30 pixels in the stereo matching direction from the monitor area R3. In this way, by taking into account the distance features of the view shown at each area, the monitor areas are offset in the stereo matching direction. This allows the pair of positionally corresponding left and right monitor areas to show the same object and therefore, under normal conditions for taking pictures, the pair of monitor areas have substantially the same brightness.

In step 2, following the step 1, the magnitude of brightness of the first monitor areas and the magnitude of brightness of the second monitor areas are calculated. That is, an average A1 of brightness values of some pixels present in the first monitor areas R1, R2, R3 in the right image area is determined. Similarly, an average A2 of brightness values of some pixels present in the second monitor areas R4, R5, R6 in the left image area is determined. Although it is possible to calculate the average of brightness values of all pixels in the monitor areas, this will increase the amount of calculations required. To avoid this problem, this embodiment calculates the brightness averages A1, A2 by sampling pixels scattered uniformly in the areas. As one example, samples are extracted every four pixels in the vertical direction and every eight pixels in the horizontal direction, and the average of the brightness values of these sampled pixels is taken as the brightness of the monitor areas as a whole.

In step 3, it is checked whether a difference (absolute value) between the brightness average A1 of the first monitor areas and the brightness average A2 of the second monitor areas is in excess of a predetermined value as a threshold value (ATH) (step 3). As described above, the left and right monitor areas show substantially the same views. Hence, under a normal condition in which the brightness levels of the left and right images are well balanced, the brightness averages A1, A2 of the left and right monitor areas are substantially equal. Under the normal condition, the step 3 decides that the difference does not exceed the predetermined value (negative decision), thus setting the fail flag NG to 0 (step 4). As a result, the normal control of the vehicle monitoring is continued. Under an abnormal situation where a brightness unbalance is produced by external disturbances, the step 3 decides that the difference exceeds the predetermined value (positive decision), thus setting the fail flag NG to 1 (step 5). As a result, a fail-safe function is executed to temporarily stop the normal monitoring control, such as the vehicle control.

In an actual control, to secure the reliability of the vehicle monitoring, it is preferred that the NG flag be switched only after the corresponding condition has continued for a predetermined cycles. For example, when the fail flag NG is to be set from 0 to 1, the change is made only when the positive decision of the step 3 has continued for 5 cycles (0.5 seconds). When the fail flag NG is to be set from 1 to 0, the change is made when the negative decision of the step 3 has continued for 20 cycles (2.0 seconds).

The fail decision of this embodiment, as described above, monitors in real time whether or not the brightness between the left and right images is balanced. When the brightness therebetween is not balanced, images taken by the cameras is determined as failure. Hence, by monitoring the brightness balance, for example, when a normal image cannot be obtained as when one of the cameras is blindfolded, it is possible to accurately detect it. The same also applies when a normal image cannot be obtained due to partial smear or fogging of the lens of one of the cameras, of windshield or the like, or due to diffused reflections from raindrops. As a result, even when an abnormal image is generated due to these external causes, the fail-safe function that correctly deals with the situation can be executed, securing a high level of safety of the stereo type vehicle monitoring apparatus.

Further, in this embodiment of the invention, fail decision is executed based on the image data of a part of the image, not the entire image. Therefore, the fail decision can be made with such a small amount of calculations as will allow the fail detection to be carried out in real time.

Further, as for the setting of the monitor areas, the tendency of parallax in these areas is considered in determining the amount of offset between the left and right monitor areas. This makes possible a further improvement of the precision of the fail decision.

As described above, in a situation not suited for the stereo processing where the brightness between the left and right images cannot be balanced, an appropriate fail-safe function that correctly deals with this situation can be executed, thus securing a high level of safety of the stereo type vehicle monitoring apparatus.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A stereo type vehicle monitoring apparatus with a fail-safe function, the apparatus comprising:
   a pair of cameras taking pictures of scenes outside of a vehicle;
   a stereo image producer producing a first image and a second image respectively based on pictures taken by said cameras;
   a calculator calculating a level of brightness of a first monitor area in the first image produced by said stereo image producer and a level of brightness of a second monitor area in the second image produced by said stereo image producer, the second monitor area positionally corresponding to the first monitor area; and
   a fail decision unit for determining a failure of said vehicle monitoring apparatus when a difference between the brightness level of the first monitor area and the brightness level of the second monitor area exceeds a predetermined value.

2. The stereo type vehicle monitoring apparatus according to claim 1, wherein a position of the second monitor area in the second image is offset in a stereo matching direction from a position of the first monitor area in the first image.

3. The stereo type vehicle monitoring apparatus according to claim 1, wherein said calculator calculates the level of the brightness of the first monitor area based on image data of a part of the first monitoring area, and the level of brightness of the second monitor area based on image data of a part of the second monitor area.

4. The stereo type vehicle monitoring apparatus according to claim 1, further comprising:
   a processor for executing the fail-safe function on the basis of the fail determination by said fail decision unit.

5. The stereo type vehicle monitoring apparatus according to claim 1, wherein the first monitor area comprises a plurality of monitor portions set in different positions in the first image, the second monitor area comprises a plurality of monitor portions set in different positions in the second image and positionally corresponding to the respective monitor portions in the first monitor area.

6. The stereo type vehicle monitoring apparatus according to claim 5, wherein a position of each monitor portion of the second monitor area is offset in a stereo matching direction from a position of the monitor portion of the first monitor area, the monitor portion of the first monitor area positionally corresponding to the monitor portion of the second monitor area.

7. The stereo type vehicle monitoring apparatus according to claim 6, wherein the amounts of offsets of the monitor portions of the second monitor area to the respective monitor portions of the first monitor area differ from one another.

8. A stereo type vehicle monitoring method of a stereo type vehicle monitoring apparatus, the method comprising:
   taking pictures of scenes outside of a vehicle by a pair of cameras;
   producing a first image and a second image based on the thus taken pictures;
   calculating a level of brightness of a first monitor area in the first image thus produced and a level of brightness of a second monitor area in the second image thus produced, the second monitor area positionally corresponding to the first monitor area; and
   determining a failure of the vehicle monitoring apparatus when a difference between the brightness level of the first monitor area and the brightness level of the second monitor area exceeds a predetermined value.

9. The stereo type vehicle monitoring according to claim 8, wherein said calculating step comprises:

reading brightness values of pixels in the first monitor area and the second monitor area; and calculating a brightness average of the first monitor area and a brightness average of the second monitor area.

10. The stereo type vehicle monitoring according to claim 8, wherein said calculating step comprises:

setting a fail-flag to "0" when the difference between the brightness level of the first monitor area and the brightness level of the second monitor area does not exceed the predetermined value; and setting the fail-flag to "1" when the difference between the brightness level of the first monitor area and the brightness level of the second monitor area exceeds the predetermined value, wherein said determining step determines the failure of said vehicle monitoring apparatus when the fail-flag is set to "1".

11. The fail-safe decision method according to claim 10, wherein said fail-flag "0" setting step sets the fail-flag to "0" when conditions that when the difference between the brightness level of the first monitor area and the brightness level of the second monitor area does not exceed the predetermined value have been continuously repeated twice or more.

12. The fail-safe decision method according to claim 10, wherein said fail-flag "1" setting step sets the fail-flag to "1" when conditions that when the difference between the brightness level of the first monitor area and the brightness level of the second monitor area exceeds the predetermined value have been continuously repeated twice or more.

13. A stereo type vehicle monitoring apparatus with a fail-safe function, the apparatus comprising:

photographing means for taking pictures of scenes outside of a vehicle;

stereo image producing means for producing a first image and a second image respectively based on the pictures taken by said photographing means;

calculating means for calculating a level of brightness of a first monitor area in the first image produced by said stereo image producing means and a level of brightness of a second monitor area in the second image produced by said stereo image producing means, the second monitor area positionally corresponding to the first monitor area; and fail decision means for determining a failure of said vehicle monitoring apparatus when a difference between the brightness level of the first monitor area and the brightness level of the second monitor area exceeds a predetermined value.

* * * * *